May 24, 1938.    W. T. JADOS    2,118,435
WASP EXCLUDER
Filed March 4, 1937

INVENTOR
WALTER T. JADOS
BY Wm. M. Cady
ATTORNEY

Patented May 24, 1938

2,118,435

UNITED STATES PATENT OFFICE 2,118,435

WASP EXCLUDER

Walter T. Jados, Wilmerding, Pa., assignor to The Westinghouse Air Brake Company, Wilmerding, Pa., a corporation of Pennsylvania Application March 4, 1937, Serial No. 128,925

18 Claims. (Cl. 303—1)

This invention relates to a fluid pressure brake equipment, and particularly to means adapted to be applied to the vent passage in a brake controlling valve device which is open to the atmosphere to prevent the vent passage from being closed or partially restricted by dirt or foreign matter deposited therein by insects or otherwise.

It is an object of this invention to provide an improved vent passage protector.

A further object of the invention is to provide an improved vent passage protector adapted for use with a valve device employed in a fluid pressure brake equipment, and arranged to offer a minimum of resistance to the flow of fluid to the atmosphere through the vent passage with which the protector is associated.

Another object of the invention is to provide an improved vent passage protector adapted for use with a brake valve device of a type employed in fluid pressure brake equipments, the vent passage protector being arranged to substantially close the vent passage in which it is located while the valve device is conditioned to cut off the release of fluid through the vent passage to thereby prevent the deposit of dirt or foreign material in the vent passage, the vent passage protector being also adapted to open communication between the vent passage and the atmosphere on operation of the valve device to release fluid through the vent passage.

A further object of the invention is to provide a vent passage protector adapted to be employed on valve devices already in service without modification of the valve devices.

Figure 1:
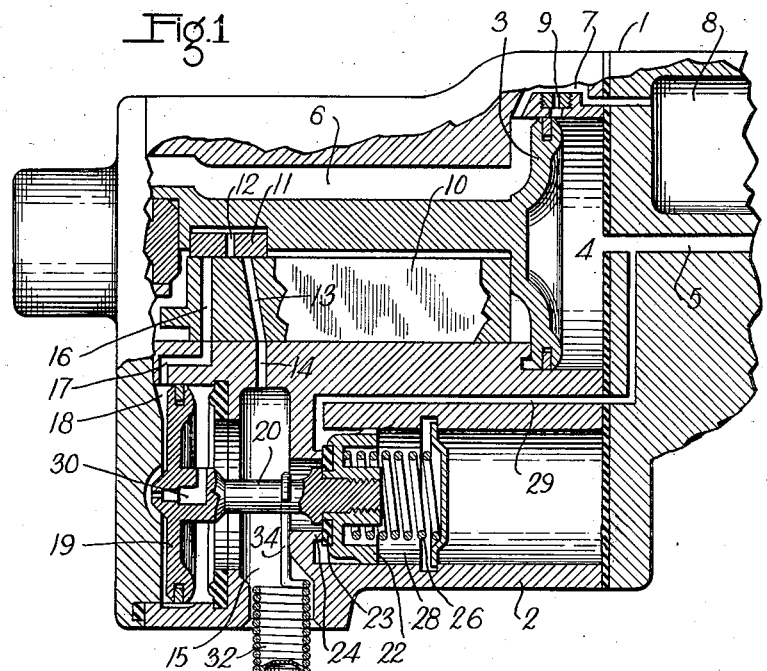
Figure 2:
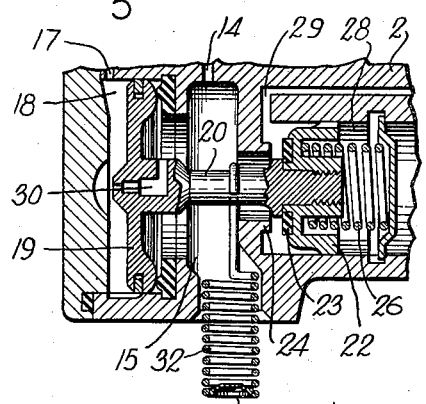
Figure 3:
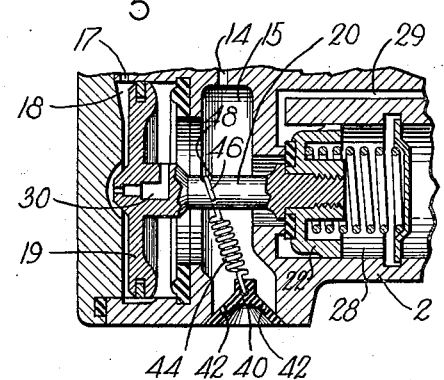
Figure 4:
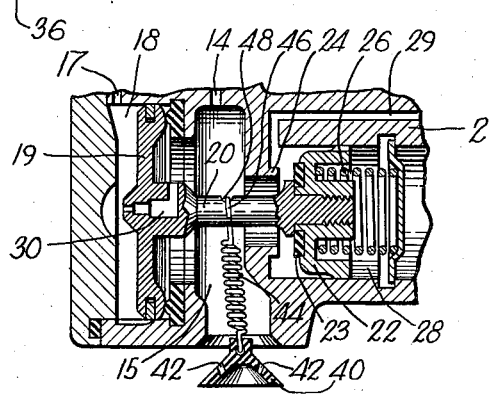

Other objects of the invention and features of novelty will be apparent from the following description taken in connection with the accompanying drawing, in which Fig. 1 is a fragmentary sectional view of a brake controlling valve device equipped with one form of the improved vent passage protector provided by this invention, Fig. 2 is a view similar to Fig. 1, but showing the vent valve piston of the valve device in the position to open the vent valve, Fig. 3 is a fragmentary sectional view showing a brake controlling valve device equipped with a modified form of vent passage protector provided by this invention, and Fig. 4 is a view similar to Fig. 3, but showing the vent valve piston of the valve device in the position to open the vent valve.

In Fig. 1 of the drawing there is illustrated a portion of a brake controlling valve device of the type with which the vent passage protector provided by this invention is adapted to be employed. The valve device shown in the drawing is of the type shown in U. S. Patent No. 2,031,213, issued February 18, 1936, to Clyde C. Farmer, and includes a pipe bracket section 1 and an emergency section 2.

The emergency section 2 comprises a body having a bore therein in which is mounted a piston 3 having at one side a chamber 4 connected by way of a passage 5 in the pipe bracket section 1 to the brake pipe, not shown. The piston 3 has at the other side a valve chamber 6 which is constantly connected by way of a passage 7 with a quick action chamber 8 formed in the pipe bracket section 1. The valve chamber 6 and the quick action chamber 8 are adapted to be charged with fluid under pressure supplied from the brake pipe through a restricted port 9 controlled by the piston 3.

A main slide valve 10 and an auxiliary slide valve 11 having movement relative to the main slide valve are mounted in the valve chamber 6 and are operated by means of the piston 3.

In operation, the emergency piston 3 is adapted to respond to a service reduction in brake pipe pressure in the chamber 4 and moves the auxiliary slide valve 11 relative to the main slide valve 10 to a service position in which a port 12 through the auxiliary slide valve 11 registers with a port 13 in the main slide valve 10, while in this position of the main slide valve the port 13 registers with a passage 14 which is open to an exhaust passage 15 formed in the body of the emergency section 2 and having one end open to the atmosphere.

Upon movement of the auxiliary slide valve 11 to the service position fluid under pressure is released from the valve chamber 6 and the quick action chamber 8 at a rate sufficient to reduce the pressure of the fluid in these chambers substantially as rapidly as the pressure of the fluid in the chamber 4 at the face of the piston 3 is reduced on a service reduction in brake pipe pressure to thereby prevent sufficient differential being developed between the pressures in the valve chamber 6 and in the brake pipe chamber 4 to cause the piston 3 to be moved to the emergency application position.

Upon an emergency reduction in brake pipe pressure in the piston chamber 4, the piston 3 operates to move the auxiliary slide valve 11 to an emergency position in which a port 16 in the main slide valve 10 is uncovered so that fluid under pressure from the valve chamber 6 flows through this passage to a passage 17, which leads to a chamber 18 at one face of a vent valve piston 19 which is mounted in a bore in the body of the emergency section 2.

The piston 19 has a stem 20 formed integral therewith and extending across the vent passage 15 at a point spaced from the open end of the vent passage. The stem 20 has secured on the end thereof a vent valve 22 carrying a sealing gasket 23 which is adapted to engage an annular seat rib 24 formed on the body of the emergency section 2 surrounding a passage open to the vent passage 15. The vent valve 22 is yieldingly pressed against the seat rib 24 by means of a coil spring 26 to cut off communication between the chamber 28 in which the vent valve is mounted, which is constantly connected with the brake pipe passage 5 by way of a passage 29, and the vent passage 15.

On an increase in the pressure of the fluid in the chamber 18 force is exerted on the vent valve piston 19 to move it to the right, as viewed in the drawing, and this movement of the vent valve piston 19 is transmitted through the stem 20 to move the vent valve 22 against the spring 26 to release fluid under pressure at a rapid rate from the brake pipe branch passage 5 by way of the passage 29, the chamber 28, and the vent passage 15.

Fluid under pressure supplied to the chamber 18 and the face of the vent valve piston 19 is gradually released therefrom through a restricted passage 30 through the piston 19, and on a reduction in the pressure of the fluid in the chamber 18 to a predetermined relatively low value, the force exerted thereby on the piston 19 is insufficient to hold the vent valve 22 against the spring 26, and the vent valve is thereupon moved by the spring 26 into engagement with the seat rib 24 to cut off communication between the brake pipe and the atmosphere through the vent passage 15.

If foreign material, such as mud, is deposited by insects, wasps, or the like in the vent passage 15, this material may prevent movement of the vent valve piston or the vent valve, or it may prevent the venting of fluid from the valve chamber 6 through the passage 14, or from the chamber 18 through the passage 30, thus interfering with the intended operation of the valve device. The vent passage protector provided by this invention operates to prevent the entrance of insects, wasps, or the like into the vent passage, and to thereby prevent the deposit of mud or other material in this passage.

The vent passage protector shown in Figs. 1 and 2 of the drawing comprises a coil spring 32 formed of suitable spring wire. The spring 32 is formed of a diameter such that it will substantially fill the portion of the vent passage 15 adjacent the open end thereof, but also so that it only loosely fills this passage. One end 34 of the spring 32 forms a hook which is adapted to loosely extend over the stem 20 of the vent valve piston 19 of the emergency section to maintain the spring 32 in position in the vent passage 15.

The spring 32 and the hooked end portion 34 thereof are arranged and proportioned so that a portion of the length of the body of the spring is normally disposed within the vent passage 15, while a portion of the length of the body of the spring projects from the passage 15 substantially as shown in Fig. 1 of the drawing.

The end of the spring 32 adjacent the hooked end portion 34 is open to the vent passage 15, while the other end of the spring is closed by means of a member 36 which may be formed of any suitable material, such as molded rubber, and is adapted to be held in position by engagement with one of the convolutions of the spring 32.

In operation, when the vent valve 22 of the emergency portion 2 is in the closed position, as shown in Fig. 1 of the drawing, the convolutions of the spring 32 engage each other to prevent the entrance of insects, wasps, or the like into the vent passage 15 between the coils of the spring, while the spring so completely fills the vent passage 15 that insects or the like, cannot enter this passage through the space between the spring and the wall of the passage. In addition, it will be seen that the end of the spring 32 is closed by the closure member 36 to prevent the entrance of insects into the passage 15 through the passage through the spring 32.

If at this time the piston 3 moves to the service position, thereby moving the auxiliary slide valve 11 to the position in which the port 12 registers with the port 13 to vent fluid under pressure at a restricted rate from the valve chamber 6 through the port 13 through the main slide valve 10, and thence through the passage 14 to the vent passage 15, this fluid may escape from the vent passage 15 to the atmosphere through the space between the spring 32 and the wall of the vent passage 15. The flow capacity of the space between the spring 32 and the wall of the vent passage 15 is ample to permit the free flow of fluid from the passage 14 to the atmosphere.

On an emergency application of the brakes fluid under pressure is supplied to the chamber 18 at the face of the vent valve piston 19, as explained in detail above, and the vent valve piston 19 is thereupon moved to the right, as viewed in Fig. 1 of the drawing, and its movement is transmitted through the stem 20 to move the vent valve 22 against the spring 26 away from the seat rib 24 to thereby open a communication through which fluid under pressure may be vented at a rapid rate from the brake pipe branch passage 5 to the vent passage 15. Upon this movement of the vent valve piston 19 the stem 20 is moved relative to the hooked end portion 34 of the spring 32. This movement of the stem 20 is permitted as the hooked end portion 34 of the spring only loosely engages the stem 20 and does not offer material resistance to movement of the stem.

Upon the supply of fluid under pressure to the vent passage 15 at a rapid rate, the pressure of the fluid therein increases, since the space between the spring 32 and the wall of the vent passage 15 permits only a restricted flow of fluid to the atmosphere, and force is exerted upon the closure member 36 tending to move it away from the stem 20 with the result that the spring 32 is stretched or extended, causing the convolutions thereof to be moved apart a short distance, thereby providing space through which fluid which flows from the vent passage 15 to the space within the coils of the spring 32 may escape between the convolutions of the spring to the atmosphere, while fluid may also escape from the vent passage 15 to the atmosphere through the space between the spring and the wall of the passage. The flow capacity of the spaces opened between the convolutions of the spring 32 is relatively large because of the relatively great length of this passage, and hence there will be substantially no restriction to the flow of fluid from the vent passage 15 to the atmosphere.

When fluid under pressure ceases to be supplied to the vent passage 15 there is a reduction in the force exerted upon the closure member 36 and the convolutions of the spring 32 are drawn together by the inherent resiliency of the material of which the spring is constructed so as to again close the spaces between the coils of the spring and prevent the entrance of foreign matter into the vent passage through these spaces.

If any foreign material is deposited on the surface of the spring 32 it will be loosened upon subsequent extension of the spring as a result of the supply of fluid to the vent passage 15 at the emergency rate, while the flow of fluid between the convolutions of the spring will dislodge this material so that the spring is, in effect, self-cleaning and will always operate to permit the rapid flow of fluid from the chamber 15 to the atmosphere.

In Figs. 3 and 4 of the drawing there is shown a portion of a valve device of the type shown in Fig. 1, and equipped with a modified form of vent passage protector provided by this invention.

This form of vent passage protector comprises a substantially conical member 40 which is adapted to engage the face of the body of the emergency section 2 surrounding the vent passage 15. The body or member 40 is formed of resilient, yieldable material, such as molded rubber, and is relatively flexible so that it will readily adjust itself to the contour of the surface of the body of the emergency section surrounding the vent passage 15.

The member 40 has passages 42 extending therethrough, while the apex of the member has an opening formed therein in which is secured one end of a spring 44. The other end of the spring 44 terminates in a hooked portion indicated at 46, which is adapted to be tightly secured in a notch, indicated at 48, formed in the stem 20 of the vent valve piston 19. The spring 44 is of such length, and the notch in the stem 20 is so located that when the piston 19 is in the normal position, as shown in Fig. 3 of the drawing, the spring 44 exerts substantial force on the member 40 to press it against the body 2 surrounding the vent passage 15 to thereby prevent the entrance of insects, wasps, or the like, into the vent passage 15.

If at this time the emergency section 2 is operated to vent fluid from the valve chamber 6 to the passage 14 this fluid will flow to the vent passage 15 and thence through the passages 42 in the member 40 to the atmosphere.

If there is a reduction in brake pipe pressure at an emergency rate the emergency section operates as described in detail above to supply fluid under pressure to the chamber 18 at the face of the vent valve piston 19, and upon an increase in the pressure of the fluid in this chamber force is exerted on the piston 19 to move it to the right, as viewed in Figs. 3 and 4 of the drawing. On this movement of the piston 19 the stem 20 is also moved and moves the vent valve 22 against the spring 26 away from the seat rib 24, while fluid under pressure is vented at a rapid rate from the brake pipe to the vent passage 15.

Upon movement of the piston 19 in a direction to move the vent valve 22 away from the seat rib 24 the notch or recess 48 in the stem 20 of the vent valve is moved somewhat closer to the member 40, thereby permitting the spring 44 to contract and thus reduce the force exerted by this spring on the member 40 and tending to hold the member 40 against the face of the emergency section.

On the supply of fluid under pressure at a rapid rate to the vent passage 15, force is exerted by this fluid upon the member 40 and moves this member against the spring 44 which expands somewhat, while the member 40 is moved away from the body of the emergency section to open a relatively large communication between the vent passage and the atmosphere.

When fluid under pressure is no longer supplied at a rapid rate to the vent passage 15 there is a reduction in the force exerted by this fluid upon the member 40 and the spring 44 thereupon contracts and moves the member 40 adjacent the body of the emergency section, while on movement of the vent valve 22 to the seated position by the spring 26, the stem 20 is moved and the notch or groove 48 therein moves the end 46 of the spring 44 so that force is again exerted by this spring upon the member 40 to press the member 40 firmly against the body of the emergency section surrounding the vent passage 15.

It will be seen that each form of the vent passage protector provided by this invention is adapted to be employed on valve devices now in service without substantial modification of these valve devices.

It will be seen also that each of the vent passage protectors provided by this invention normally operates to substantially close the vent passage and thereby prevent the entrance of insects, wasps, or the like, into the vent passage, that each operates on the rapid supply of fluid under pressure to the vent passage to open a relatively large communication between the vent passage and the atmosphere through which fluid may escape from the vent passage, and further that each operates to again substantially close the vent passage as soon as the supply of fluid under pressure to the vent passage is cut off.

While two embodiments of the improved vent passage protector provided by this invention have been illustrated and described in detail, it should be understood that the invention is not limited to these details of construction, and that numerous changes and modifications may be made without departing from the scope of the following claims.

Having now described my invention, what I claim as new and desire to secure by Letters Patent, is:

1. In a vent passage protector adapted for use with a valve device of a type having a body provided with a vent passage open at one end to the atmosphere and a vent valve movable to control the venting of fluid through said passage, the vent valve having an element associated therewith, the vent passage protector comprising a member adapted to cooperate with the body of the valve device to substantially close the open end of the vent passage, and means carried by said element for maintaining said member in position.

2. In a vent passage protector adapted for use on a valve device of a type having a body provided with a vent passage open at one end to the atmosphere and a vent valve controlling the venting of fluid through said passage, the vent valve having an element associated therewith, a closure member adapted to substantially close the vent passage, and a securing member mounted on said element to maintain the closure member in position.

3. In a vent passage protector adapted for use on a valve device of a type having a body provided with a vent passage open at one end to the atmosphere and a vent valve controlling the venting of fluid through said passage, the vent valve having an element associated therewith, a closure member adapted to substantially close the vent passage, and a securing member carried by said element for maintaining the closure member in position, one of said members being resiliently yieldable whereby fluid under pressure vented to the vent passage by the vent valve effects a yielding movement of the closure member and thereby a relatively free flow of fluid from the vent passage to the atmosphere.

4. In a vent passage protector adapted for use on a valve device of the type comprising a body having a vent passage therein open at one end to the atmosphere and a vent valve controlling the venting of fluid to said passage, the vent valve having an element associated therewith, the vent passage protector comprising a member adapted to engage the face of the body of the valve device surrounding said vent passage to substantially close said passage, and yielding means connecting said member with said element for yieldingly maintaining said member in engagement with the face of the body of the valve device.

5. In a vent passage protector adapted for use on a valve device of the type comprising a body having a vent passage therein open at one end to the atmosphere and a vent valve controlling the venting of fluid to said passage, the vent valve having an element associated therewith, the vent passage protector comprising a member adapted to engage the face of the body of the valve device surrounding said vent passage to substantially close said passage, and yielding means carried by said element for yieldingly maintaining said member in engagement with the face of the body of the valve device, said yielding means being adapted to permit said member to be moved away from the face of the body of the valve device on the venting of fluid under pressure to said vent passage to thereby open communication from said vent passage to the atmosphere.

6. In a vent passage protector adapted for use on a valve device of the type comprising a body having a vent passage therein open at one end to the atmosphere and a vent valve controlling the venting of fluid to said vent passage, the vent valve being movable between a closed position and an open position and having an element associated therewith, the vent passage protector comprising a member adapted to engage the body of the valve device surrounding said vent passage to substantially close the open end of said vent passage, and securing means associated with said member and adapted to be connected to the element associated with the vent valve to maintain said member in position relative to said body, the securing means being operative in the closed position of the vent valve to hold the member against the body of the valve device and being operative in the open position of the vent valve to facilitate the movement of the member away from the face of the body of the valve device to open communication between said vent passage and the atmosphere.

7. In a vent passage protector adapted for use on a valve device of the type comprising a body having a vent passage therein open at one end to the atmosphere and a vent valve controlling the venting of fluid to said vent passage, the vent valve being movable between a closed position and an open position and having an element associated therewith, the vent passage protector comprising a member adapted to engage the body of the valve device surrounding said vent passage to substantially close the open end of said vent passage, yielding means associated with said member and adapted to be connected to the element associated with the vent valve for securing said member in position relative to the body of the valve device, the yielding means being operative in the closed position of the vent valve to exert one degree of force on said member to press it against the face of the body of the valve device, and being operative in the open position of the valve to exert substantially less force on said member to press it against the face of the body of the valve device.

8. In a vent passage protector adapted for use on a valve device of the type comprising a body having a vent passage therein open at one end to the atmosphere and a vent valve controlling the venting of fluid to said vent passage, the vent valve being movable between a closed position and an open position and having an element associated therewith, the vent passage protector comprising a member adapted to engage the body of the valve device surrounding said vent passage to substantially close the open end of said vent passage, yielding means associated with said member and adapted to be connected to the element associated with the vent valve for securing said member in position relative to the body of the valve device, said yielding means being held by said element under tension in the closed position of the vent valve to yieldingly maintain said member seated, the movement of said element upon movement of said vent valve to the open position reducing the tension on the yielding means and thereby the force with which the said member is held seated.

9. In a vent passage protector adapted for use on a valve device of the type comprising a body having a vent passage therein open at one end to the atmosphere and a vent valve controlling the venting of fluid to said vent passage, the vent valve being movable between a closed position and an open position and having an element associated therewith, the vent passage protector comprising a member adapted to engage the body of the valve device surrounding said vent passage to substantially close the open end of said vent passage, and a resiliently yieldable member having one end connected to said member and adapted to have its other end connected to the element associated with the vent valve, said element being operative in the closed position of the vent valve to yieldingly press said member against the face of the body of the valve device to close the vent passage therein.

10. In a vent passage protector adapted to be employed on a valve device of the type having a body having a vent passage therein open at one end to the atmosphere and having a vent valve controlling the venting of fluid to said passage, the vent valve having an element associated therewith, the vent passage protector comprising a coil spring adapted to substantially fill the portion of the vent passage adjacent the open end thereof, and means associated with said spring and carried by said element to maintain the spring in position in said vent passage.

11. In a vent passage protector adapted to be employed on a valve device of the type having a body having a vent passage therein open at one end to the atmosphere and having a vent valve controlling the venting of fluid to said passage, the vent valve having an element associated therewith, the vent passage protector comprising a coil spring adapted to substantially fill the portion of the vent passage adjacent the open end thereof, one end of said spring having means associated therewith and connected to said element to maintain the spring in position in said vent passage, and means to substantially close the other end of said spring.

12. In a vent passage protector adapted to be employed on a valve device of the type having a body having a vent passage therein open at one end to the atmosphere and having a vent valve controlling the venting of fluid to said passage, the vent valve having an element associated therewith, the vent passage protector comprising a coil spring adapted to be mounted in said vent passage and having means associated therewith and connected to said element to maintain the spring in position in said passage, the spring being adapted to substantially fill said vent passage to prevent the deposit of foreign matter in said passage and being adapted on the venting of fluid to said passage by said vent valve to expand to permit the flow of fluid from the vent passage to the atmosphere between the convolutions thereof.

13. In combination, a valve device having a vent passage therein open to the atmosphere, and protecting means for preventing the deposit of foreign matter in said vent passage, the protecting means comprising a coil spring having one end positioned in said vent passage and having means associated with said end for securing the spring relative to the device, the other end of said spring projecting from said vent passage and having means associated therewith for closing said end of the spring, the spring being proportioned to substantially fill the vent passage and being formed with the convolutions thereof normally located adjacent each other to prevent the deposit of material in said vent passage, the spring being adapted on the venting of fluid to said vent passage to expand to permit the flow of fluid from the vent passage to the atmosphere between the convolutions of the said spring.

14. In combination, a valve device having a vent passage therein open to the atmosphere, and protecting means for preventing the deposit of foreign matter in said vent passage, the protecting means comprising a coil spring having its coils normally in engagement and provided with means for closing the outer end of the spring to thereby form a substantially closed chamber within the spring, said spring extending into and substantially closing communication through said passage to the atmosphere, whereby upon the venting of fluid under pressure to said passage the increase in fluid pressure in said chamber effects the expansion of the spring to permit the flow of fluid from said chamber and the vent passage to the atmosphere through the spaces formed between the coils of the spring by the expansion of the spring.

15. In a vent passage protector adapted for use on a valve device of a type having a body provided with a vent passage open at one end to the atmosphere and a vent valve controlling the venting of fluid through said passage, the vent valve having an element associated therewith and extending into said passage, the vent passage protector comprising a closure member adapted to substantially close the vent passage, and a securing member adapted to be secured on the element associated with the vent valve to maintain the closure member in position.

16. In a vent passage protector adapted for use on a valve device of a type having a body provided with a vent passage open at one end to the atmosphere and a vent valve controlling the venting of fluid through said passage, the vent valve having an element associated therewith and extending into said passage, the vent passage protector comprising a closure member adapted to substantially close the vent passage, and a securing member adapted to be secured on the element associated with the vent valve to maintain the closure member in position, one of said members being resiliently yieldable whereby fluid under pressure vented to the vent passage by the vent valve effects a yielding movement of the closure member and thereby a relatively free flow of fluid from the vent passage to the atmosphere.

17. In a vent passage protector adapted for use on a valve device of a type having a body provided with a vent passage open at one end to the atmosphere and a vent valve controlling the venting of fluid through said passage, the vent valve having an element associated therewith and extending into said passage, the vent passage protector comprising a member adapted to engage the face of the body of the valve device surrounding the vent passage to substantially close said passage, and yielding means associated with said closure member and adapted to be connected to the element associated with the vent valve to yieldingly maintain the closure member in engagement with the face of the body of the valve device.

18. In a vent passage protector adapted for use on a valve device of a type having a body provided with a vent passage open at one end to the atmosphere and a vent valve controlling the venting of fluid through said passage, the vent valve having an element associated therewith and extending into said passage, the vent passage protector comprising a coil spring adapted to substantially fill the portion of the vent passage adjacent the open end thereof, one end of the spring having means associated therewith and adapted to be connected to the element associated with the vent valve to maintain the spring in position in said vent passage, and means to substantially close the other end of the spring.

WALTER T. JADOS.